United States Patent
Yokomitsu et al.

(10) Patent No.: US 9,413,959 B2
(45) Date of Patent: Aug. 9, 2016

(54) CAMERA

(71) Applicant: Panasonic Intellectual Property Management Co., Ltd., Osaka (JP)

(72) Inventors: Yasushi Yokomitsu, Fukuoka (JP); Kazuhiko Yamaguchi, Fukuoka (JP); Haruo Tagawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/814,224

(22) Filed: Jul. 30, 2015

(65) Prior Publication Data

US 2016/0080651 A1  Mar. 17, 2016

(30) Foreign Application Priority Data

Sep. 12, 2014  (JP) ................................. 2014-186486

(51) Int. Cl.
*H04N 5/232* (2006.01)
*H04N 5/77* (2006.01)
*G06F 1/16* (2006.01)

(52) U.S. Cl.
CPC ............ *H04N 5/23241* (2013.01); *G06F 1/163* (2013.01); *H04N 5/772* (2013.01)

(58) Field of Classification Search
CPC ..................................................... H04N 5/225
See application file for complete search history.

(56) References Cited

U.S. PATENT DOCUMENTS

| | | | | |
|---|---|---|---|---|
| 2007/0064114 A1* | 3/2007 | Uchida | ................... | G11B 20/10 348/208.2 |
| 2007/0248312 A1* | 10/2007 | Kobayashi | ........... | G11B 27/032 386/231 |
| 2014/0333828 A1* | 11/2014 | Han | ....................... | H04N 5/225 348/373 |
| 2014/0362245 A1* | 12/2014 | Tachiwa | ............. | H04N 5/23206 348/211.2 |

FOREIGN PATENT DOCUMENTS

JP  2014-146184 A  8/2014

\* cited by examiner

*Primary Examiner* — W B Perkey
(74) *Attorney, Agent, or Firm* — Seed IP Law Group PLLC

(57) ABSTRACT

A contact terminal is provided with a charging port to which a charging voltage is applied and a CON.DET port which detects a voltage change. In a case where a plug of a charging cable is connected to the contact terminal, the charging port and the CON.DET port are electrically connected to each other via the charging cable so that a signal level in the CON.DET port reaches an "H" level. In a case where the plug of the charging cable is removed from the contact terminal, the charging voltage is not applied to the CON.DET port so that a signal level in the CON.DET port changes from an "H" level to an "L" level, and thus recording of image information output from an imaging unit of the camera is started.

10 Claims, 6 Drawing Sheets

CAMERA

BACKGROUND OF THE INVENTION

1. Field of the Invention

The present invention relates to a portable camera which can perform recording.

2. Description of the Related Art

In recent years, the introduction of a wearable camera has been studied in order to support the duties of policemen or security guards.

An authentication system using a wearable camera has been developed, and is disclosed in for example, Japanese Patent Unexamined Publication No. 2014-146184. The authentication system disclosed in Japanese Patent Unexamined Publication No. 2014-146184 includes a portable terminal which is a flash lamp with a camera, a cradle having a function of charging the portable terminal, and a personal computer connected to the cradle. In a case where the system is used in security, a security guard (user) who is about to start patrolling first performs authentication work which includes inputting of personal authentication information and then removes the portable terminal from the cradle. In response to the removal, recording is started in the portable terminal, and a security start notification mail which includes authentication result data is transmitted from the personal computer to an external apparatus connected to the personal computer. When the security guard returns the portable terminal to the cradle after finishing the patrol, a security end notification mail is transmitted to the external apparatus. Then, the recording in the portable terminal is finished and captured image data is transmitted to a main recording medium in the personal computer.

However, in the authentication system disclosed in Japanese Patent Unexamined Publication No. 2014-146184, recording is started when the camera which is a portable terminal is removed from the cradle, but there is a case where recording is not necessary right after the removal from the cradle depending on the use environment. For this reason, if a user arbitrarily performs recording, there is a concern that recording may not be performed when necessary, but if normal recording is performed, there is a problem in that unnecessary recording is performed and the storage capacity of the portable terminal is wasted.

SUMMARY OF THE INVENTION

The present invention has been made in consideration of the related circumstances, and an object thereof is to provide a camera which can perform recording only when necessary.

According to the present invention, there is provided a camera including an imaging unit; a detection unit that detects a change from a first state to a second state; and a recording control unit that controls whether or not image information output from the imaging unit is recorded on a recording medium on the basis of a determination flag in a case where the detection unit detects the change.

According to the present invention, it is possible to perform recording only when necessary.

DETAILED DESCRIPTION OF THE PREFERRED EMBODIMENTS

Hereinafter, preferred embodiments of the present invention will be described in detail with reference to the drawings.

Embodiment 1

Figure 1A:
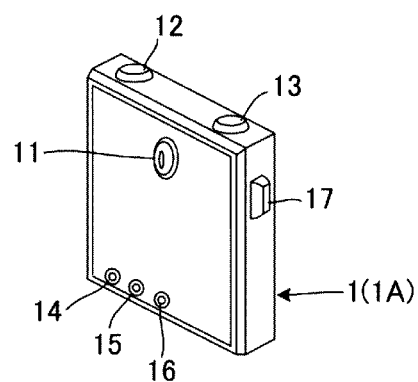
FIGS. 1A and 1B are perspective views illustrating an exterior of a camera according to Embodiment 1 of the present invention.
Figure 1B:
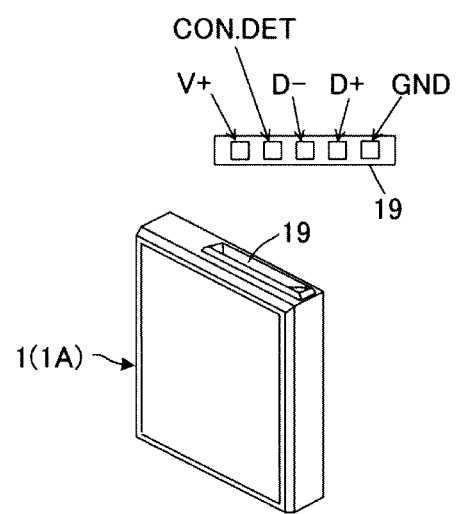

FIGS. 1A and 1B are perspective views illustrating the exterior of a camera according to Embodiment 1 of the present invention, in which FIG. 1A illustrates a front surface side and FIG. 1B illustrates a rear surface side. In this case, FIG. 1B illustrates a state in which the camera is upside down. As illustrated in FIGS. 1A and 1B, camera 1 is a camera which can perform recording, and is formed in a longitudinally long shape. Lens 11 is provided on the upper center of a main body front surface of camera 1, and recording button 12 and snapshot button 13 are provided on a main body upper surface. Three light emitting diodes (LEDs) 14 to 16 are provided at the same intervals on a lower part of the main body front surface of camera 1, and Wi-Fi (registered trademark) button 17 is provided on a main body right surface of camera 1. Contact terminal 19 for connection to an external terminal such as a personal computer is provided on a main body lower surface of camera 1. Camera 1 according to the present embodiment is assumed to be used in a police station, but, needless to say, camera 1 may be used not only in a police station but also in various offices. Camera 1 is a portable camera, and is thus, for example, a wearable camera which is mounted on the body and is used.

Recording button 12 is a button which is operated for capturing a moving image, and, when the button is pressed, a moving image starts to be captured. Snapshot button 13 is a button which is operated for capturing a still image, and, when the button is pressed, a still image starts to be captured. LED 14 is a lamp indicating a power supply state of camera 1, and is turned on when a power button (not illustrated) is pressed. LED 15 is a lamp indicating a recording state of camera 1, and is turned on when recording button 12 is pressed. LED 15 is continuously turned on during the recording. LED 16 is a lamp indicating the state of wireless communication state using Wi-Fi, and is turned on when Wi-Fi button 17 is pressed. Specifically, LED 16 is an LED which can be turned on in two colors, and is turned on in different colors in accordance with pressing of Wi-Fi button 17. In other words, the LED is turned on in a first color (for example, red) where the first pressing is performed, turned on in a second color (for example, green) when the second pressing is performed, and turned off when the third pressing is performed. These states are repeated by pressing Wi-Fi button 17. In other words, every time Wi-Fi button 17 is pressed, turning-on in the first color, turning-on in the second color, turning-off, turning-on in the first color, . . . are repeated in this order.

As modes regarding communication, an access point mode and a station mode are prepared in camera 1, and, every time Wi-Fi button 17 is pressed, the access point mode, the station mode, communication off, and the access point mode, . . . are changed in this order. The turning-on color of LED 16 is changed according to the changing of the modes. In other words, during the access point mode, the LED is turned on in the first color, and during the station mode, the LED is turned on in the second color. During communication-off, the LED is turned off.

As illustrated in FIG. 1B, contact terminal 19 is provided with "charging port V+ (hereinafter, also referred to as a V+ port)", a "CON.DET port (detection port)", "data ports D− and D+", and a "GND port (ground port)". Charging port V+ is a port to which a charging voltage is applied. The CON.DET port is a port for detecting a voltage change. Data ports D− and D+ are ports for transmitting image data or the like which is captured by camera 1 to a personal computer. Contact terminal 19 is connected to a charging cable or an AC adaptor which will be described later.

Figure 2:
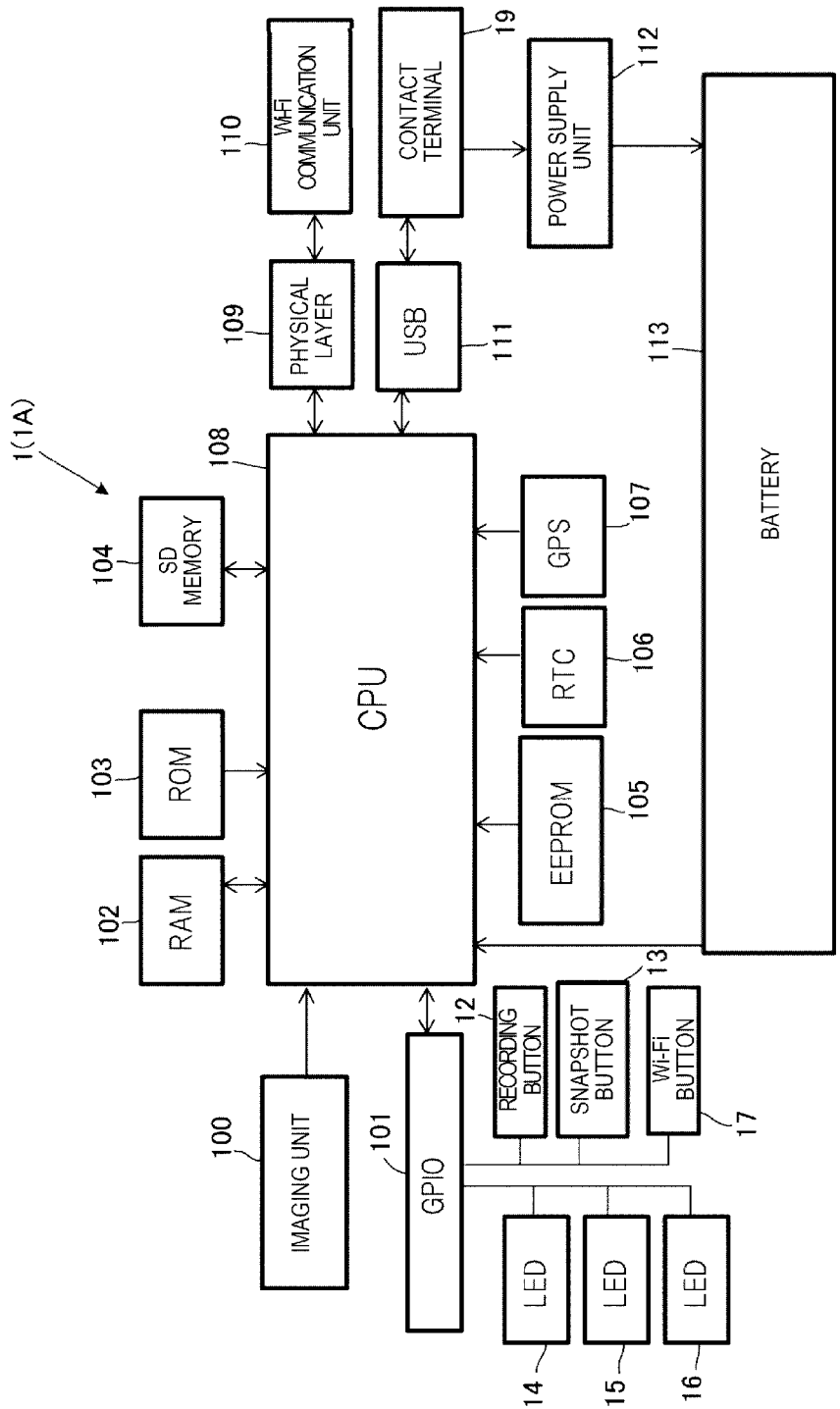
FIG. 2 is a block diagram illustrating a schematic configuration of the camera illustrated in FIG. 1.

FIG. 2 is a block diagram illustrating a schematic configuration of camera 1. In FIG. 2, camera 1 includes not only the above-described recording button 12, snapshot button 13, LEDs 14 to 16, Wi-Fi button 17, and contact terminal 19, but also imaging unit 100, general purpose input/output (GIPO) 101, random access memory (RAM) 102, read only memory (ROM) 103, SD memory 104, electrically erasable programmable read-only memory (EEPROM) 105, real-time clock (RTC) 106, global positioning system (GPS) 107, central processing unit (CPU) 108, physical layer 109, Wi-Fi communication unit 110, universal serial bus (USB) 111, power supply unit 112, and battery 113. CPU 108 corresponds to a detection unit and a recording control unit. SD memory 104 is a medium which is attachable to and detachable from camera 1, and is, for example, an SD card, but may be built into the main body of camera 1.

Imaging unit 100 has not only the above-described lens 11 but also a solid-state imaging device such as a charge coupled device (CCD) type image sensor or a complementary metal oxide semiconductor (CMOS) type image sensor, and outputs captured image data. GPIO 101 is a parallel interface, and performs the inputting and outputting of signals between the above-described recording button 12, snapshot button 13, LEDs 14 to 16, and Wi-Fi button 17, and CPU 108.

RAM 102 is a work memory used during operation of CPU 108. ROM 103 stores a program for controlling CPU 108. SD memory 104 stores captured image data output from imaging unit 100. SD memory 104 is attachable to and detachable from the main body of camera 1. EEPROM 105 stores a serial number of camera 1. RTC 106 outputs the present time information. GPS 107 outputs the present position information. Physical layer 109 is a first layer of open systems interconnection (OSI) reference model, and prescribes connection between Wi-Fi communication unit 110 and CPU 108. Wi-Fi communication unit 110 performs Wi-Fi communication. USB 111 is a serial bus, and can connect camera 1 to a personal computer (which will be described later). Power supply unit 112 charges battery 113 with power which is supplied via contact terminal 19. Battery 113 supplies power to the respective units of camera 1.

CPU 108 operates according to a program stored in ROM 103. CPU 108 uses RAM 102 in its operation, and obtains the present time information from RTC 106 and also obtains the present position information from GPS 107. CPU 108 detects pressing of recording button 12, snapshot button 13, and Wi-Fi button 17, and performs a process on an operated button. In other words, in a case where recording button 12 is pressed, captured image data output from imaging unit 100 is preserved in SD memory 104 as a moving image. In a case where snapshot button 13 is pressed, captured image data obtained when button 13 is pressed is preserved in SD memory 104 as a still image. In a case where recording button 12 is pressed, LED 15 is turned on. In a case where Wi-Fi button 17 is pressed, Wi-Fi communication is performed by using Wi-Fi communication unit 110. In a case where Wi-Fi button 17 is pressed, LED 16 is turned on, and, in this case, if a mode regarding communication is the access point mode, the LED is turned on in the first color, and if a mode is the station mode, the LED is turned on in the second color. CPU 108 performs moving image capturing, still image capturing, and Wi-Fi communication.

Figure 3:
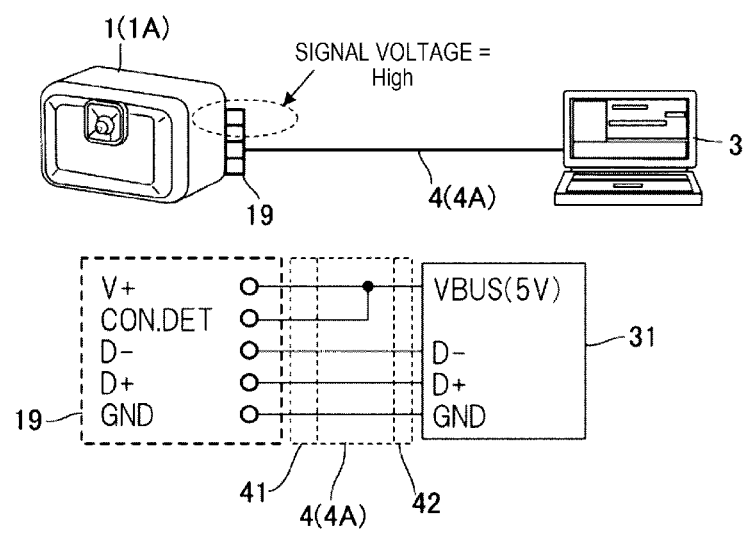
FIG. 3 is a diagram illustrating a connection state between the camera illustrated in FIG. 1 and a personal computer.

FIG. 3 is a diagram illustrating a state in a case where camera 1 and personal computer 3 are connected to each other via a charging cable 4 (first cable). In FIG. 3, plug 41 which can be connected to contact terminal 19 of camera 1 is installed at one end of charging cable 4, and plug 42 which can be connected to receptacle 31 of personal computer 3 is installed at the other end thereof. Charging cable 4 connects a VBUS (5 V) port of receptacle 31 of personal computer 3 to the V+ port and the CON.DET port of contact terminal 19 of camera 1. Charging cable 4 connects a D− port of receptacle 31 to the D− port of contact terminal 19, a D+ port of receptacle 31 to the D+ port of contact terminal 19, and a GND port of receptacle 31 to the GND port of contact terminal 19. Plug 41 which can be connected to contact terminal 19 is easily released from plug 42 which can be connected to receptacle 31 of personal computer 3. For example, plug 41 is connected to contact terminal 19 via a magnet port or the like which is fixed by a magnetic force, and plug 42 is connected to receptacle 31 by inserting a USB port or the like thereinto.

If charging port V+ and the CON.DET port of contact terminal 19 of camera 1 are electrically connected to each other via charging cable 4, in a case where plug 41 of charging cable 4 is released from contact terminal 19 of camera 1, a charging voltage is not applied to the CON.DET port of contact terminal 19 of camera 1. When it is detected that the charging voltage is not applied to the CON.DET port of contact terminal 19, CPU 108 of camera 1 starts to record captured image data output from imaging unit 100 in SD memory 104. In other words, in a case where plug 41 of charging cable 4 is released from contact terminal 19 of camera 1, recording is started.

Figure 4:
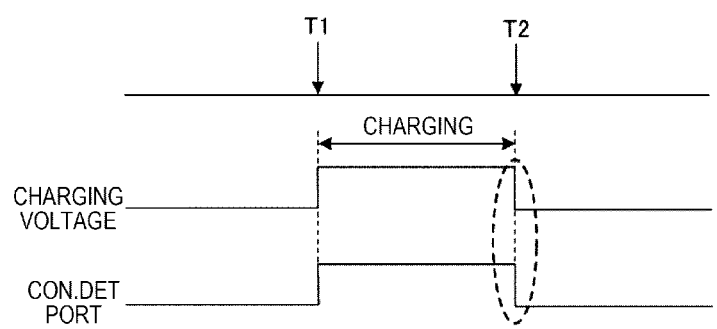
FIG. 4 is a diagram illustrating a charging voltage in a V+ port and a change in a voltage in a CON.DET port of a contact terminal of the camera illustrated in FIG. 1.

FIG. 4 is a diagram illustrating a charging voltage in the V+ port and a change in a voltage in the CON.DET port of contact terminal 19 of camera 1. When camera 1 is connected to personal computer 3 via charging cable 4, a charging voltage of 5 V is applied to the V+ port of contact terminal 19 of camera 1, and a charging voltage of 5 V is also applied to the CON.DET port of contact terminal 19, at the time point (time point T1) at which charging cable 4 is connected to camera 1. The charging voltage is applied to camera 1, and thus battery 113 of camera 1 is charged. The charging voltage is applied to the CON.DET port of contact terminal 19 of camera 1, and thus a signal level in the CON.DET port reaches a "Hi (H)" level.

Then, if charging cable 4 is removed from camera 1, the supply of the charging voltage to the V+ port of the contact terminal 19 of camera 1 is stopped at this time point (the time point T2), and the supply of the charging voltage to the CON.DET port of contact terminal 19 of camera 1 is also stopped. When the supply of the charging voltage to the CON.DET port of contact terminal 19 of camera 1 is also stopped, a signal level in the CON.DET port of contact terminal 19 of camera 1 changes from an "H" level to a "low (L)" level, and camera 1 detects the timing at which the signal level changes from an "H" level to an "L" level, and starts recording at this timing. In other words, if CPU 108 of camera 1 detects the change in the signal level, image data output from imaging unit 100 is received and is recorded in SD memory 104. A change in the signal level from an "H" level to an "L" level in the CON.DET port may be detected, and a change in the signal level from an "L" level to an "H" level may be detected as long as necessary timing can be detected. One of the signal levels is not required to be 0. In the present embodiment, a signal level of a voltage is a detection target, but other detection targets may be employed, for example, whether or not communication with an external device is in progress may be a detection target.

Figure 5:
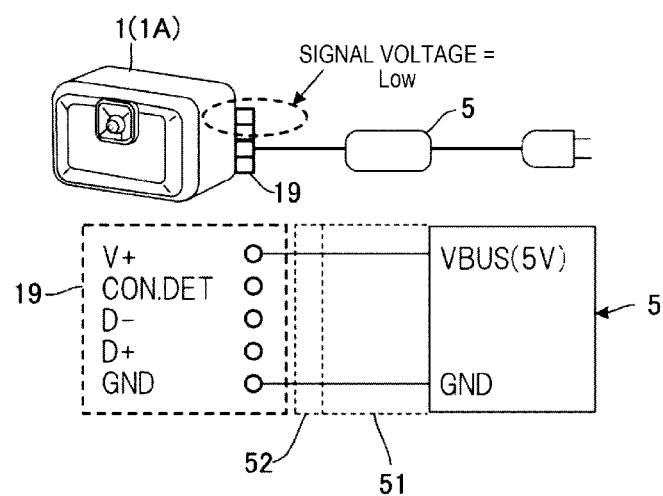
FIG. 5 is a diagram illustrating a connection state of the camera illustrated in FIG. 1 and an AC adaptor.

On the other hand, in a case where camera 1 is directly charged with power supplied not from the personal computer, AC adaptor 5 (a second cable; refer to FIG. 5) is used and is connected to contact terminal 19 of camera 1. FIG. 5 is a diagram illustrating a connection state of camera 1 and AC adaptor 5. In FIG. 5, plug 52 which can be connected to contact terminal 19 of camera 1 is installed at cable 51 of AC adaptor 5 on a charging voltage output side. When plug 52 is connected to contact terminal 19 of camera 1, a VBUS (5 V) port of plug 52 is connected to the V+ port of contact terminal 19 of camera 1, and a GND port of plug 52 is connected to the GND port of contact terminal 19 of camera 1. Unlike charging cable 4, AC adaptor 5 has no port which is connected to the CON.DET port of contact terminal 19 of camera 1, and thus a signal level in the CON.DET port does not change due to the removal and insertion of AC adaptor 5. For this reason, even if AC adaptor 5 is released from camera 1, camera 1 does not start recording. In FIG. 5, the camera is directly connected to AC adaptor 5, but, for convenience, camera 1 may be connected to AC adaptor 5 by using a cradle.

Figure 6:
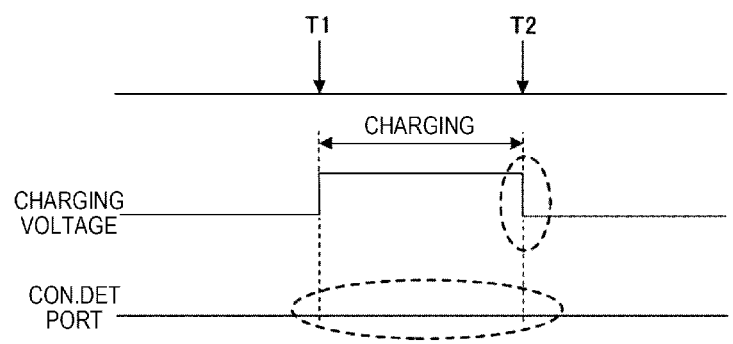
FIG. 6 is a diagram illustrating a charging voltage in the V+ port and a change in a voltage in the CON.DET port of the contact terminal of the camera illustrated in FIG. 1.

FIG. 6 is a diagram illustrating a charging voltage in the V+ port and a change in a voltage in the CON.DET port of contact terminal 19 of camera 1. In FIG. 1, at a time point (time point T1) at which camera 1 is connected to AC adaptor 5, a charging voltage of 5 V is applied to the V+ port of contact terminal 19 of camera 1. The charging voltage is applied to camera 1, and thus battery 113 of camera 1 is charged. At this time, a signal level in the CON.DET port is still an "L" level. Then, AC adaptor 5 is released from camera 1. The supply of the charging voltage to the V+ port of the contact terminal 19 of camera 1 is stopped at this time point (the time point T2), but since the signal level in the CON.DET port of contact terminal 19 is still an "L" level, in other words, as the signal level is not changed, recording is not started in camera 1.

Personal computer 3 supplies power for charging to camera 1, and also receives captured image data preserved in camera 1 and preserves the data therein. In relation to stoppage of recording, charging cable 4 may be connected to camera 1 so as to manually stop recording, or recording may be performed only for a predetermined amount of time by using a timer.

Hereinafter, specific application examples of the above-described system regarding camera 1 will be described in detail. The examples herein are only examples, and the present invention is not limited to the following description. In a case where camera 1 is used by the police, camera 1 is charged by using AC adaptor 5 in a police station. In a patrol car (not illustrated), camera 1 is charged by using charging cable 4 from personal computer 3 mounted in the patrol car.

In the above use environment, prior to patrol, a policeman first takes out camera 1 which is being charged in the police station and mounts camera 1 on his/her body (the head, the shoulder, the chest, or the like). In this case, since recording is not required to be performed if a case or the like does not happen, recording is not performed (recording is not started) at the time when camera 1 is removed from AC adaptor 5. In other words, the operation illustrated in FIGS. 5 and 6 is performed.

The policeman who has taken out camera 1 from the police station rides in the patrol car and patrols. At this time, in the patrol car, camera 1 is charged by personal computer 3 via charging cable 4. An in-vehicle camera which is different from camera 1 connected to personal computer 3 is provided in the patrol car, and recording is performed with this in-vehicle camera during the patrol in the patrol car. In a case where a case or the like happens, the policeman goes to the scene by patrol car, gets off the car, and arrives on the scene. At this time, since the patrol car is far away from the scene, the in-vehicle camera cannot record the scene. For this reason, camera 1 performs recording, but, in this case, if the policeman starts recording by pressing the recording button, there is a possibility that the policeman may forget to perform recording. Therefore, recording is automatically performed when camera 1 is removed from charging cable 4. In other words, the operation illustrated in FIGS. 3 and 4 is performed.

As described above, since camera 1 is connected to charging cable 4 via the magnet port, the policeman is not required to intentionally remove the cable, that is, the charging cable 4 is easily removed if a predetermined force is applied. Thus, even in a case where the policeman rushes out of the patrol car, the policeman may unintentionally start recording.

As mentioned above, by using camera 1, it is possible to automatically perform recording when necessary (when recording cannot be performed with the in-vehicle camera, or the like) during patrol.

Regarding captured image data, captured image data of the in-vehicle camera and captured image data of camera 1 are uploaded to a server of the police station or a cloud server at predetermined timing so as to be collectively managed. In this case, the policeman who has captured the captured image data of the in-vehicle camera and the captured image data of camera 1 is also managed, and thus the policeman can be specified by using a user ID via personal computer 3 in both the in-vehicle camera and camera 1. In a case where the captured image data is directly uploaded to the server from camera 1, for example, the user ID may be transmitted to camera 1, and the captured image data may be transmitted to the server along with the user ID when uploaded from camera 1. In a case where the captured image data of camera 1 is transmitted via personal computer 3, the captured image data of the in-vehicle camera, the captured image data of camera 1, and the user ID may be collectively transmitted to the server from personal computer 3.

The captured image data of camera 1 may be transmitted to the server at any timing, and is preferably transmitted to the server during connection to personal computer 3. Since camera 1 is of a portable type, there is a limitation in the storage capacity, if data which is recorded during patrol, that is, during charging by personal computer 3, is transmitted so as to be deleted, a margin is made in the storage capacity, and thus it is possible to prevent a situation in which recording cannot be performed when necessary.

The captured image data which has been acquired by a policeman is used as evidence and is thus required to be protected from tampering. For this reason, even an attachable and detachable SD memory can be removed and inserted only by using a specific method.

As mentioned above, according to camera 1 of the present embodiment, contact terminal 19 is provided with charging port V+ to which a charging voltage is applied and the CON.DET port which detects a voltage change; in a case where plug 41 of charging cable 4 is connected to contact terminal 19, charging port V+ is electrically connected to the CON.DET port via charging cable 4 so that a signal level in the CON.DET port reaches an "H" level; in a case where plug 41 of charging cable 4 is removed from contact terminal 19, the charging voltage is not applied to the CON.DET port so that a signal level in the CON.DET port changes from an "H" level to an "L" level; and thus image information output from imaging unit 100 of camera 1 starts to be recorded. Therefore, in a case where charging cable 4 is removed from camera 1, image information starts to be recorded by camera 1, and thus recording can be performed only when necessary. Since unnecessary recording is not performed, a sufficient amount of recording of a case-implicit scene can be performed. Particularly, in the present embodiment, since camera 1 is assumed to be used by a policeman, image capturing is not performed between the police station and the scene of the crime, and image capturing can be performed from the time when the policeman reaches the scene of the crime.

Since unnecessary recording is not performed, it is possible to reduce cases of the occurrence of situations in which recording cannot be performed when necessary, even when using a portable camera having a small storage capacity.

Also in a case where captured image data is uploaded from camera 1, there is no unnecessary recorded data, and thus it is possible to reduce the amount of transmitted data, and particularly to reduce the transmission time.

Embodiment 2

A camera according to Embodiment 2 of the present invention has the same configuration as that of camera 1 according to the above-described Embodiment 1, and thus FIGS. 1A to 3 are applied by analogy. The reference sign 1A is given to the camera due to a partial difference in the function of the camera.

In camera 1 according to the above-described Embodiment 1, charging cable 4 is used which can connect charging port V+ and the CON.DET port of contact terminal 19 of camera 1 to each other, but, in camera 1A of Embodiment 2, charging cable 4 and AC adaptor 5 are not required to be used, and a general charging cable and AC adaptor can be used. Charging cable 4 has wiring for electrically connecting charging port V+ and the CON.DET port of contact terminal 19 of camera 1 to each other, but, in the present embodiment, there is no such wiring. In the same manner as in Embodiment 1 of the present invention, a description will be made by exemplifying the police, but other examples may be employed.

Hereinafter, the reference sign 4A is given to a general charging cable used in camera 1A according to Embodiment 2. A general AC adaptor may be used instead of charging cable 4A, and the following description will be made by using charging cable 4A. In this case, in the same manner as in the above-described charging cable 4, plug 41 which can be connected to contact terminal 19 of camera 1 is installed at one end of charging cable 4A, and plug 42 which can be connected to receptacle 31 (refer to FIG. 3) of personal computer 3 is installed at the other end thereof. However, charging cable 4A does not have wiring for electrically connecting charging port V+ and the CON.DET port of contact terminal 19 of camera 1 to each other.

In camera 1 according to the above-described Embodiment 1, recording is started in a case where plug 41 of charging cable 4 is removed from camera 1, and a charging voltage is not applied to the CON.DET port of contact terminal 19 of camera 1; however, in camera 1A according to Embodiment 2, a flag can be set, and recording is started in a case where charging cable 4A is removed from camera 1A in a state in which a predetermined flag is set. The setting of a flag is performed by CPU 108, and a set flag is held in RAM 102. The flag is set to "0", "1", "2", or "3", and "0" and "1" are set in the flag when camera 1A is connected to personal computer 3 and logs in to or logs out from personal computer 3. In other words, during login, "1" is set, and during logout, "0" is set. On the other hand, "2" and "3" in the flag is manually set by a user. The manual setting of the flag by the user may be performed, for example, by providing a dedicated button on camera 1A, or through a combination of operations of recording button 12, snapshot button 13, and Wi-Fi button 17. For example, the flag may be set on personal computer 3 via charging cable 4A, and, for example, the flag may be set by using a GUI of a setting application.

In case of flag="0" or "1"

Figure 7:
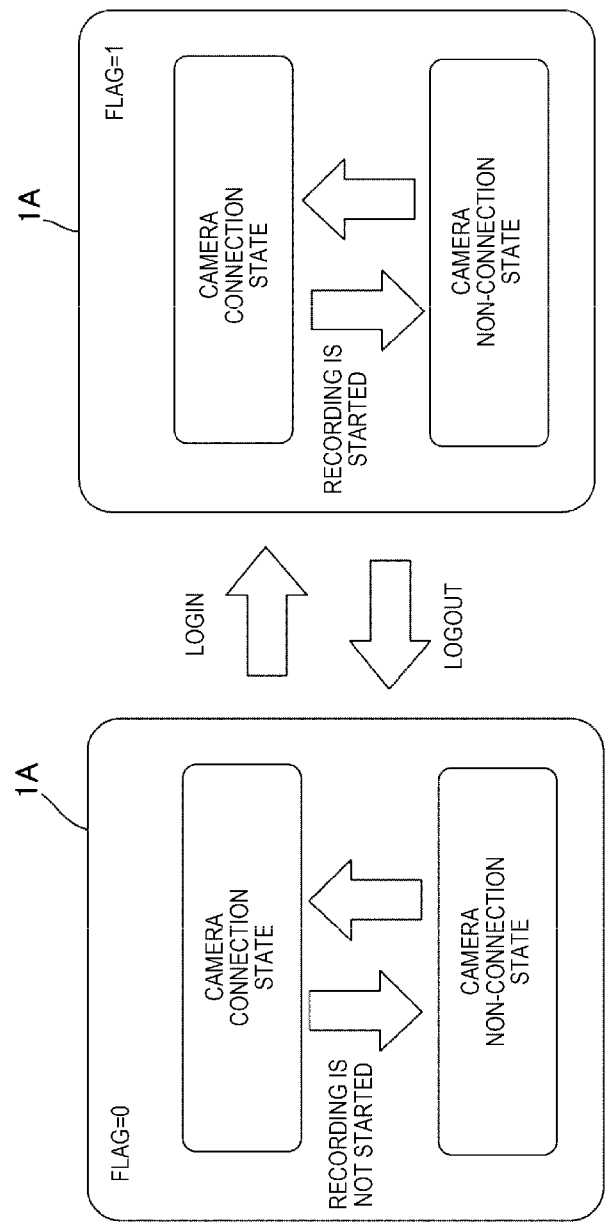
FIG. 7 is a diagram for explaining whether or not recording is performed in a case where a flag is set to "0" and "1" in a camera according to Embodiment 2 of the present invention.

FIG. 7 is a diagram for explaining whether or not recording is performed in a case where a flag is set to "0" and "1" in camera 1A, and is a conceptual diagram (a state transition diagram) illustrating flag management in camera 1A. In FIG. 7, a camera connection state is a state in which camera 1A is connected to a cradle (not illustrated) or is connected to charging cable 4A, and a camera non-connection state is a state in which camera 1A is not connected to charging cable 4A or is not connected to the cradle via charging cable 4A.

A flag of camera 1A is normally set to "0", and is in this state when camera 1A is present in the police station. Therefore, recording is not started even if a state transitions from the camera connection state to the camera non-connection state. In other words, the recording is not started even if camera 1A is released from the cradle in the police station.

If a policeman carries camera 1A into a patrol car, connects camera 1A to personal computer 3 mounted in the patrol car via charging cable 4A, and logs in on a management screen of personal computer 3 (the policeman starts patrolling), the flag changes from "0" to "1". In a case where charging cable 4A is released from camera 1A after the flag changes to "1", recording is started. In other words, in a case where a state transitions from the camera connection state to the camera non-connection state when the flag is set to "1", recording is started. As mentioned above, charging cable 4A is released from camera 1A in the patrol car, and recording is started. In relation to stoppage of recording after recording is started, charging cable 4A may be connected to camera 1A so as to manually stop recording, or recording may be performed only for a predetermined time by using a timer.

Then, if the policeman returns to the patrol car, connects camera 1A to charging cable 4A, and logs out from the management screen of personal computer 3 (the policeman finishes patrolling), the flag changes from "1" to "0". When the flag is set to "0", as described above, recording is not started even if a state transitions from the camera connection state to the camera non-connection state. In other words, even if charging cable 4A is removed from camera 1A, recording is not started. As mentioned above, in a case where the flag is set to "0" or "1", the flag changes depending on whether login or logout is performed, and, in a case where charging cable 4A is removed from camera 1A, whether or not recording is performed changes.

In case of flag="2"

Figure 8:
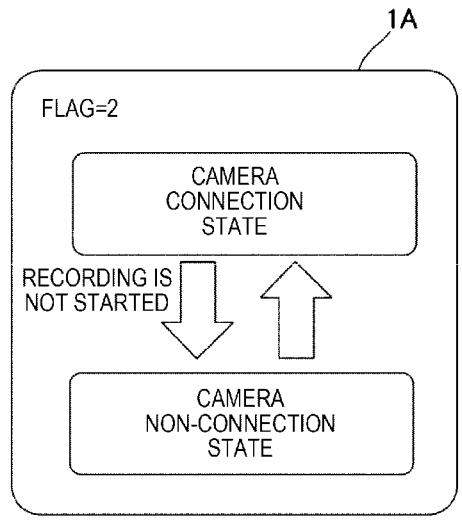
FIG. 8 is a diagram for explaining whether or not recording is performed in a case where a flag is set to "2" in the camera illustrated in FIG. 7.

FIG. 8 is a diagram for explaining whether or not recording is performed in a case where a flag is set to "2" in camera 1A. In FIG. 8, in a case where the flag is set to "2", the flag does not change depending on whether login or logout is performed, and recording is not started even if charging cable 4A is removed from camera 1A. In a case where the flag is set to "0" or "1", the flag changes from "0" to "1" depending on login, but, in this case, the flag is still set to "2" even if login is executed. Therefore, even if charging cable 4A is released, recording is not started. As mentioned above, the flag is set to "2", and thus the automatic recording function can be turned off.

In case of flag="3"

Figure 9:
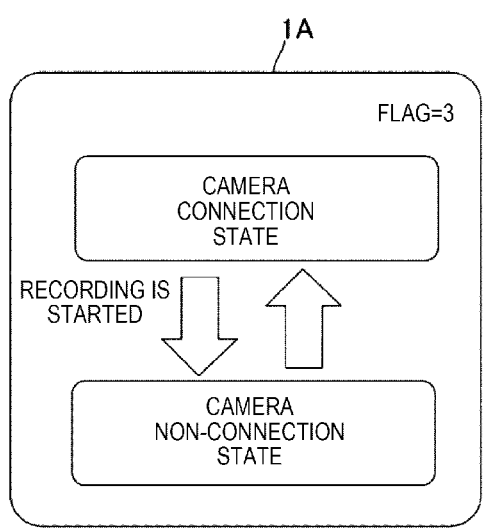
FIG. 9 is a diagram for explaining whether or not recording is performed in a case where a flag is set to "3" in the camera illustrated in FIG. 7.

FIG. 9 is a diagram for explaining whether or not recording is performed in a case where a flag is set to "3" in camera 1A. In FIG. 9, in a case where the flag is set to "3", the flag does not change depending on whether login or logout is performed, and recording is started if charging cable 4A is removed from camera 1A. In other words, the flag is set to "3", and thus the automatic recording function can be turned on. Therefore, if charging cable 4A is removed even in the police station, recording is started. As mentioned above, the flag is set to "3", and thus the automatic recording function can be turned on.

As mentioned above, according to camera 1A according to Embodiment 2, a flag can be set; login to personal computer 3 connected to charging cable 4A is executed so that the flag is set to "1"; and recording is started in a case where charging cable 4A is removed in a state in which the flag is set to "1". Therefore, since camera 1A starts recording when charging cable 4A is removed from camera 1A, recording can be performed only when necessary. Since unnecessary recording is not performed, a sufficient amount of recording of a case-implicit scene can be performed. Particularly, in the present embodiment, since camera 1A is assumed to be used by a policeman, image capturing is not performed between the police station and the scene of the crime, and image capturing can be performed from the time when the policeman reaches the scene of the crime.

In camera 1A according to Embodiment 2, connection to charging cable 4A may be detected, and control of whether or not captured image data recorded in SD memory 104 is uploaded to personal computer 3 may be performed depending on a flag at that time.

In camera 1A according to Embodiment 2, in a case where a personal computer (not illustrated) is connected to a cradle (not illustrated), captured image data recorded in SD memory 104 may be uploaded to the personal computer when camera 1A is connected to the cradle. Also this is the same for the above case, the captured image data recorded in SD memory 104 is uploaded so as to leave a memory space in SD memory 104, and thus it is possible to secure the recording time.

In camera 1A according to Embodiment 2, in a case where login to personal computer 3 mounted in the patrol car is executed, an ID of camera 1A is required to be registered in personal computer 3 in advance, but an ID may be given even to camera 1A whose ID is not registered, by personal computer 3.

In addition to the above-described flag, a flag may be provided which is used to protect privacy when image capturing is not desired to be performed by camera 1, for example, when becoming distant from the patrol car when eating a meal or using the toilet.

What is claimed is:

1. A camera comprising:
an imaging unit;
a detection unit that detects a change from a first state to a second state; and
a recording control unit that controls whether or not recording image information output from the imaging unit on a recording medium is started on the basis of a determination flag in a case where the detection unit detects the change,
wherein the camera can be connected to a first cable and a second cable,
wherein the first state is a state in which the camera is connected to the first cable or the second cable,
wherein the second state is a state in which the camera is not connected to the first and second cables,
wherein the determination flag corresponds to a connection state of the first cable, and
wherein the recording control unit starts to record image information output from the imaging unit when the state of the camera changes from a connection state to a non-connection state.

2. The camera of claim 1,
wherein the first cable is a charging cable through which charging can be performed,
wherein the camera is provided with a charging port to which a charging voltage is applied and a detection port that detects a voltage change,
wherein the charging port and the detection port are configured to be electrically connected to each other in the charging cable, and
wherein, in a case where a plug of the charging cable is removed from the camera, the charging voltage is not applied to the detection port, and thus recording of image information output from the imaging unit is started.

3. A camera comprising:
an imaging unit;
a detection unit that detects a change from a first state to a second state; and
a recording control unit that controls whether or not recording image information output from the imaging unit on a recording medium is started on the basis of a determination flag in a case where the detection unit detects the change,
wherein the camera can be connected to a cable,
wherein the first state is a state in which the camera is connected to the cable,
wherein the second state is a state in which the camera is not connected to the cable,
wherein the determination flag is a flag, and
wherein recording of image information output from the imaging unit is started when the flag is set to a predetermined value.

4. The camera of claim 3,
wherein the flag is set to a predetermined value when a user logs in.

5. A camera comprising:
an imaging unit; and
a recording control unit that controls whether or not recording on a recording medium of image information output from the imaging unit is started,
wherein the camera is connectable to a first cable that connects to a personal computer provided in a vehicle and through which power is provided to the camera, wherein the camera is connectable to a second cable that connects to an AC adapter and through which power is provided to the camera, wherein the recording control unit starts to record the image information output from the imaging unit when the camera is disconnected from the first cable, and the recording control unit does not start to record the image information output from the imaging unit when the camera is disconnected from the second cable.

6. The camera of claim 5, wherein the first cable is a charging cable through which charging can be performed, wherein the camera is provided with a charging port to which a charging voltage is applied and a detection port that detects a voltage change, and wherein the charging port and the detection port are configured to be electrically connected to each other by the charging cable.

7. A camera comprising:

an imaging unit;

a detection unit that detects a change from a first state to a second state; and a recording control unit that controls whether or not recording of image information output from the imaging unit on a recording medium is started, in a case where the detection unit detects the change, wherein the camera is connectable to a first cable that connects to a personal computer provided in a vehicle and through which power is provided to the camera, wherein the camera is connectable to a second cable that connects to an AC adaptor remote from the vehicle and through which power is provided to the camera, wherein the first state is a state in which the camera is connected to the first cable, wherein the second state is a state in which the camera is not connected to the first cable, and wherein recording of image information output from the imaging unit is started when the detection unit detects the change from a first state to a second state.

8. The camera of claim 7, wherein the vehicle is a patrol car.

9. The camera of claim 7 wherein the AC adaptor remote from the vehicle is located in a police station.

10. A camera comprising:

an imaging unit;

a detection unit that detects a change from a first state to a second state; and a recording control unit that controls whether or not recording of image information output from the imaging unit on a recording medium is started, in a case where the detection unit detects the change, wherein the camera is connectable to a first cable that connects to a personal computer and through which power is provided to the camera, wherein the camera is connectable to a second cable that connects to an AC adaptor and through which power is provided to the camera, wherein the camera can be connected to the first cable, wherein the first state is a state in which the camera is connected to the first cable, wherein the second state is a state in which the camera is not connected to the first cable, and wherein recording of image information output from the imaging unit is started when the detection unit detects the change from a first state to a second state.

* * * * *